United States Patent [19]

Hahm et al.

[11] 4,072,219
[45] Feb. 7, 1978

[54] MULTI-PART DISC BRAKE

[75] Inventors: Heinz Guenter Hahm, Frankfurt; Klaus Neef, Seligenstadt, both of Germany

[73] Assignee: ITT Industries, Incorporated, New York, N.Y.

[21] Appl. No.: 762,912

[22] Filed: Jan. 27, 1977

Related U.S. Application Data

[63] Continuation of Ser. No. 636,345, Nov. 28, 1975, abandoned.

[30] Foreign Application Priority Data

Dec. 7, 1974  Germany .............................. 2458034

[51] Int. Cl.² ........................................... F16D 65/12
[52] U.S. Cl. ............................................. 188/218 XL
[58] Field of Search ............ 188/1 B, 218 R, 218 XL, 188/250 E

[56] References Cited

U.S. PATENT DOCUMENTS

| | | | |
|---|---|---|---|
| 1,745,301 | 1/1930 | Johnston | 188/218 A |
| 2,180,759 | 11/1939 | Kneisley | 188/1 B UX |
| 2,285,924 | 6/1942 | Halfvarson | 188/1 B UX |
| 3,478,849 | 11/1969 | Hahm | 188/218 XL |

Primary Examiner—Duane A. Reger
Attorney, Agent, or Firm—John T. O'Halloran; Alfred C. Hill

[57] ABSTRACT

At least two juxtaposed brake rings forming a brake disc for disc brakes are carried by a cup-shaped hub and connected with one another by the hub. Each of the two members have the same basic form and are fitted into one another. Each of the members integrally forms a brake ring and hub members which are connected with one another by a fastening device for securing the multi-part brake disc to a carrier.

10 Claims, 1 Drawing Figure

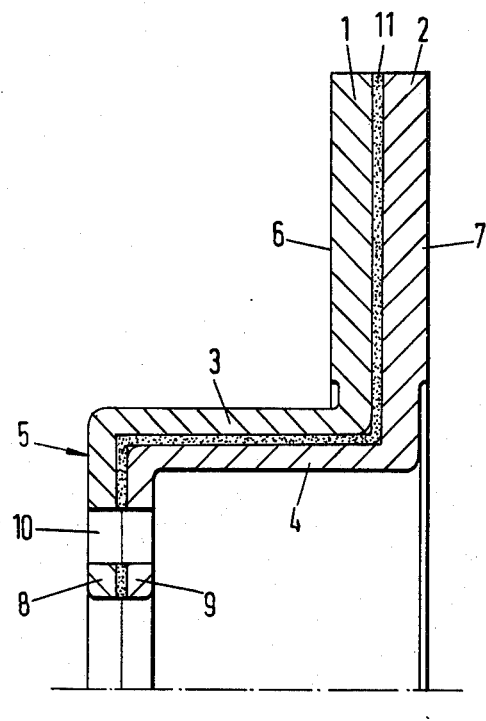

MULTI-PART DISC BRAKE

CROSS-REFERENCE TO RELATED APPLICATIONS

This is a continuation of application Ser. No. 636,345, filed Nov. 28, 1975, now abandoned.

FIELD OF THE INVENTION

Multi-part brake discs for disc brakes.

BACKGROUND OF THE INVENTION

Multi-part brake discs are known and specifically from U.S. Pat. No. 3,478,849. The purpose as described in the aforesaid patent is to prevent brake noise occurring due to vibrations set up during braking. In disc brakes this problem is of growing significance as there is a tendency to increase the use being made of friction materials having a high coefficient of friction which increases the tendency to cause brake squeal. Brake discs of the type referred to in U.S. Pat. No. 3,478,849 and other similar types do not meet the essential requirements.

SUMMARY OF THE INVENTION

The device of this invention is a multi-part brake disc for disc brakes for particular use in automotive vehicles which comprises at least two juxtaposed brake rings both of which are carried by a cup-shaped hub and are connected with one another by the hub. In accordance with the preferred embodiment of this invention, a brake disc of the multi-part type is provided which has a substantial improvement in noise damping. A cup-shaped hub is assembled from at least two members of the same basic form fitted into one another, each of said members being integrally formed with a brake ring portion and hub member portion. The hub members are connected with one another by means of a fastening means which secures the brake disc to a carrier. It has been found that this construction provides a brake disc which very effectively suppresses vibration noises during braking. Furthermore, a brake disc is provided which is of very simple design and which can be produced without difficulty utilizing known methods and specifically casting of the brake parts with subsequent machining by turning. An additional advantage obtained by the device of this invention is that no additional means are required for fastening or connecting the individual members of the brake disc of this invention to a carrier.

The construction of the brake disc of this invention is based on a determination that vibrations generated at a brake disc occur in both the radial and axial directions. The brake disc constructed in accordance with this invention has contact faces both in the radial and axial direction between the individual members forming the brake disc. The two members are frictionally engaged at their contact faces in order to suppress vibrations.

In one preferred embodiment of this invention, the adjacent brake rings and the adjacent hub members are made to have the same thickness. This will assist in preventing warping of the brake disc due to heat. An additional advantage may be obtained by applying a layer of a sound deadening material, which is not affected by changes of temperature, is positioned on the contact faces between the brake rings and hub members portions.

DESCRIPTION OF THE DRAWING

The sole FIGURE is a partial cross section of one embodiment of the multi-part brake disc of this invention.

DESCRIPTION OF THE PREFERRED EMBODIMENTS

The multi-part brake disc illustrated in the FIGURE consists of brake rings 1 and 2, each of which is integrally formed with members 3 and 4 of a cup-shaped hub 5. Members 3 and 4 constitute the bottom of hub 5 and flanges 8 and 9 constitute the side walls of hub 5. The brake rings 1, 2 are provided with friction faces 6 and 7 for frictional engagement with the brake pads (not shown) of a disc brake. The faces of brake rings 1, 2 lying opposite the friction faces 6, 7 of the brake rings 1, 2 are in frictional contact with each other. When the brake pads (not shown) are pressed against the friction faces 6, 7, the brake rings 1, 2 are pressed against one another at their contact faces. The members 3, 4 of the hub 5 are correspondingly dimensioned so that their contacting faces are in frictional engagement. The radially extending flanges 8, 9 of the members 3, 4 are also in abutment in the direction of the brake disc axis including a plurality of common bores 10 evenly spaced around the periphery. The bores 10 serve to receive bolts, screws or other fastening devices (not shown) required for fastening the multi-part brake disc of this invention to a carrier (not shown) for instance, on the wheel hub (not shown). The use of fastening means passing through bores 10 thus at the same time provides a connection between the two parts of the brake disc and at the same time fastens the multi-part disc to its carrier.

The manufacture of the brake disc of this invention poses no particular problems since each part comprising a brake ring and a hub member is, in its basic form outlined, very similar to a conventional brake disc and differs principally from former brake discs in that it is less thick. The approved methods for manufacturing a brake disc may be utilized as a matter of course. It should be understood that it is quite possible to deep-draw the sheet hub members with the brake ring elements 1, 2 being joined after they are casted. The only requirement is that after the brake disc is assembled, the brake rings 1, 2 must frictionally rest against the hub members 5.

To simplify mounting of the multi-part disc of this invention on a vehicle, for example, during assembly line operation, the diameter of the abutting cylindrical faces of the hub member 5 may be adapted so that friction between the hub members is such as to firmly connect the two parts of the brake disc of this invention after they have been fitted into one another so that they will not fall apart thereafter.

It will be seen that the brake disc illustrated in FIG. 1 has contacting surfaces which are in frictional engagement and which thus suppress vibrations. It should be also seen that the adjacent brake rings and the adjacent hub members are of the same thickness in order to prevent warping of the composite brake disc due to heat.

In a further embodiment a layer of sound deadening material 11 which is not affected by changes in temperature is applied to the contacting surfaces between the brake ring portions and hub member portions.

While specific embodiments have been described, it should be understood that other forms may be employed which fall within the scope of the appended claims.

What is claimed is:

1. A multi-part brake disc for disc brakes for attachment to a brake carrier on an automotive vehicle comprising:

at least two juxtaposed brake rings carried by a cup-shaped hub having a bottom, said brake rings being connected with one another at said hub, said cup-shaped hub having side walls extending outwardly from said bottom in one direction and said brake rings extending outwardly from said bottom in a direction opposite from said one direction;

said cup-shaped hub comprising at least two hub members of substantially the same cup-like shape fitted into one another;

each of said hub members having an integrally formed brake ring thereon; and peripherally spaced openings through said side walls of said hub members for fastening means for interconnecting said hub members and said brake rings and for securing the assembled brake disc to said carrier.

2. The multi-part brake disc of claim 1, wherein said brake rings are of the same thickness.

3. The multi-part brake disc of claim 1, wherein said hub members are of the same thickness.

4. The multi-part brake disc of claim 1, wherein both said brake rings and said hub members are of the same thickness.

5. The multi-part brake disc of claim 1, further including a layer of sound deadening material applied on the contacting faces of said brake rings and hub members.

6. The multi-part brake disc of claim 2, further including a layer of sound deadening material applied on the contacting faces of said brake rings and hub members.

7. The multi-part brake disc of claim 3, further including a layer of sound deadening material applied on the contacting faces of said brake rings and hub members.

8. The multi-part brake disc of claim 4, further including a layer of sound deadening material applied on the contacting faces of said brake rings and hub members.

9. A multi-part brake disc for disc brakes for attachment to a carrier on automotive vehicles comprising:

at least two members having integrally formed cup-shaped hub member portions having a bottom and side walls extending outwardly from said bottom in one direction and brake ring portions extending outwardly from said bottom in a direction opposite to said one direction, said portions being formed so as to provide for frictional engagement along their interior surfaces throughout their extent, whereby said members may be fitted into one another;

a plurality of bores provided through said side walls of said hub member portions; and fastening means extending through said bores for connecting said members together and for securing the assembled members to said carrier.

10. The multi-part brake disc of claim 9, further including a layer of a sound deadening material applied to substantially all of the contacting surfaces between said members.

* * * * *